United States Patent
Surjaatmadja et al.

(10) Patent No.: US 10,711,577 B2
(45) Date of Patent: Jul. 14, 2020

(54) MULTI-ORIENTED HYDRAULIC FRACTURING MODELS AND METHODS

(71) Applicant: Halliburton Energy Services, Inc., Houston, TX (US)

(72) Inventors: Jim Basuki Surjaatmadja, Duncan, OK (US); Bryan John Lewis, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 363 days.

(21) Appl. No.: 15/753,908

(22) PCT Filed: Sep. 25, 2015

(86) PCT No.: PCT/US2015/052175
§ 371 (c)(1),
(2) Date: Feb. 20, 2018

(87) PCT Pub. No.: WO2017/052580
PCT Pub. Date: Mar. 30, 2017

(65) Prior Publication Data
US 2018/0187521 A1     Jul. 5, 2018

(51) Int. Cl.
  *E21B 41/00*  (2006.01)
  *E21B 43/26*  (2006.01)
  (Continued)

(52) U.S. Cl.
  CPC .......... *E21B 41/0092* (2013.01); *E21B 43/26* (2013.01); *E21B 49/00* (2013.01); *G05B 17/02* (2013.01); *E21B 43/267* (2013.01)

(58) Field of Classification Search
  CPC .... E21B 41/0092; E21B 43/26; E21B 43/267; E21B 49/00; E21B 17/02
  See application file for complete search history.

(56) References Cited

U.S. PATENT DOCUMENTS

| 5,765,642 A | 6/1998 | Surjaatmadja |
| 7,237,612 B2 | 7/2007 | Surjaatmadja et al. |

(Continued)

FOREIGN PATENT DOCUMENTS

| WO | WO-2008/093264 A1 | 8/2008 |
| WO | WO-2008/142406 A2 | 11/2008 |

(Continued)

OTHER PUBLICATIONS

Lewis et al., "A Unique Hydraulic Fracturing Technique Utilizing Dynamic Rock Behavior and Temporary Changes in Geomechanic Stress Ansiotropy to Optimize Hydrocarbon Recovery in Unconventional Formations," SPE-176887-MS, 2015, 11 pages.

(Continued)

*Primary Examiner* — Eunhee Kim
(74) *Attorney, Agent, or Firm* — McGuireWoods LLP

(57) ABSTRACT

A multi-oriented hydraulic fracturing (MOHF) model may incorporate the pseudo-plastic properties of the formation and tiny tectonic motions from fracturing to enhance MOHF operations. For example, a method may include modeling a simulated wellbore penetrating a simulated subterranean formation with a MOHF model having (1) static inputs and (2) dynamic inputs that comprise pseudo-plastic properties of rocks that comprise the subterranean formation; simulating a first fracture in the subterranean formation with first fracture operational parameters with the MOHF model; calculating formation stresses with the MOHF model after the first fracture; simulating a second fracture in the subterranean formation with of second fracture operational parameters with the MOHF model; and calculating a simulated fracture network characteristic for each of the plurality of first and second fracture operational parameters with the MOHF model, thereby producing several simulated fracture (Continued)

network characteristics that may be used for selecting the preferred operational parameters.

20 Claims, 15 Drawing Sheets

(51) Int. Cl.
    *G05B 17/02*     (2006.01)
    *E21B 49/00*     (2006.01)
    *E21B 43/267*     (2006.01)

(56) References Cited

U.S. PATENT DOCUMENTS

| | | |
|---|---|---|
| 7,711,487 B2 | 5/2010 | Surjaatmadja |
| 7,730,951 B2 | 6/2010 | Surjaatmadja et al. |
| 7,740,072 B2 | 6/2010 | Surjaatmadja |
| 7,946,340 B2 | 5/2011 | Surjaatmadja et al. |
| 8,104,539 B2 | 1/2012 | Stanojcic et al. |
| 2005/0125209 A1 | 6/2005 | Soliman et al. |
| 2008/0083532 A1* | 4/2008 | Surjaatmadja .......... E21B 43/26 166/250.1 |
| 2014/0098635 A1 | 4/2014 | Lin |
| 2015/0041120 A1* | 2/2015 | Gumarov ................ E21B 47/10 166/250.1 |
| 2015/0204174 A1* | 7/2015 | Kresse .................... E21B 43/26 166/250.01 |

FOREIGN PATENT DOCUMENTS

| | | |
|---|---|---|
| WO | WO-2014055184 A1 | 4/2014 |
| WO | WO-2014/105659 A1 | 7/2014 |

OTHER PUBLICATIONS

Lewis et al., "Method to Create Multiple Collocated Hydraulic Fractures Using a Temporary LocalizedChange in Stress Anisotropy Produced During an Initial Stimulation Treatment," SPE-174738-MS, 2015, 26 pages.

Surjaamtmadja et al., "Evaluating Micro-Tectonic Induce Rock Dynamics Requires New Rock Tes Equipment," 8th Asian Rock Mechanics Symposim, Oct. 2014, 11 pages.

Surjaatmadja et al., "A Novel Hydraulic Fracturing Technique Greatly Improves Hydrocarbon Recovery Through the Use of Temporary Beneficial Changes in Stress Anisotropy," SPE-1760176-MS, 2015, 16 pages.

International Search Report and Written Opinion from PCT/2015/052175, dated Jun. 23, 2016, 11 pages.

* cited by examiner

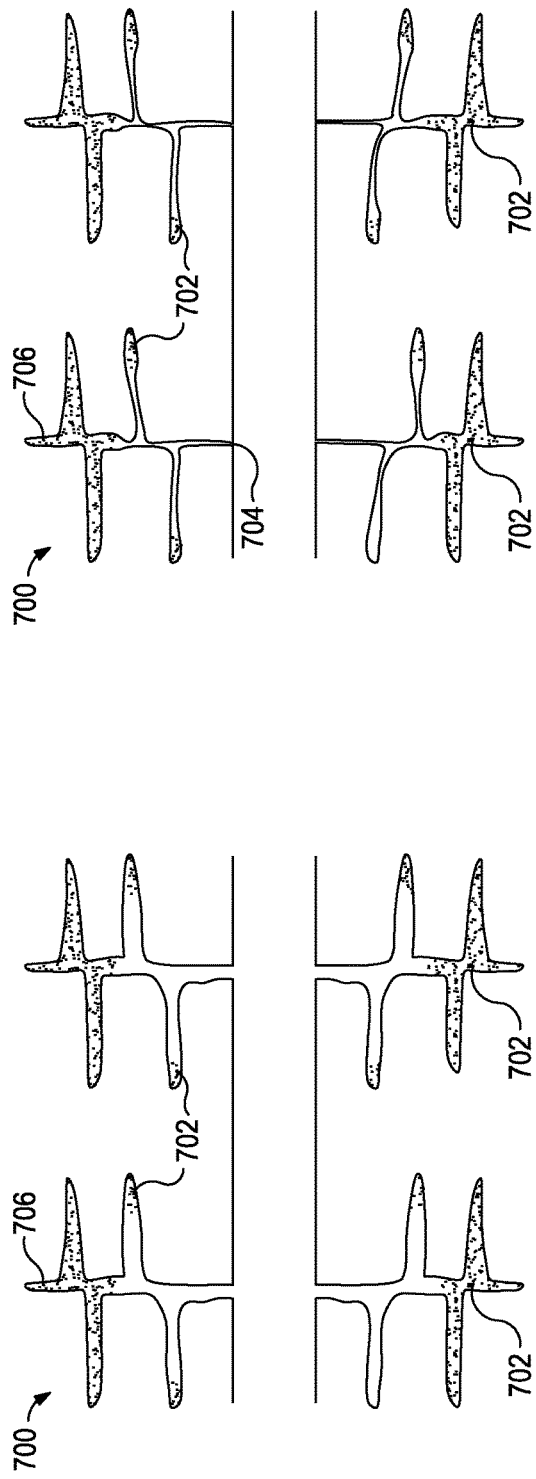
FIG. 7A
FIG. 7B
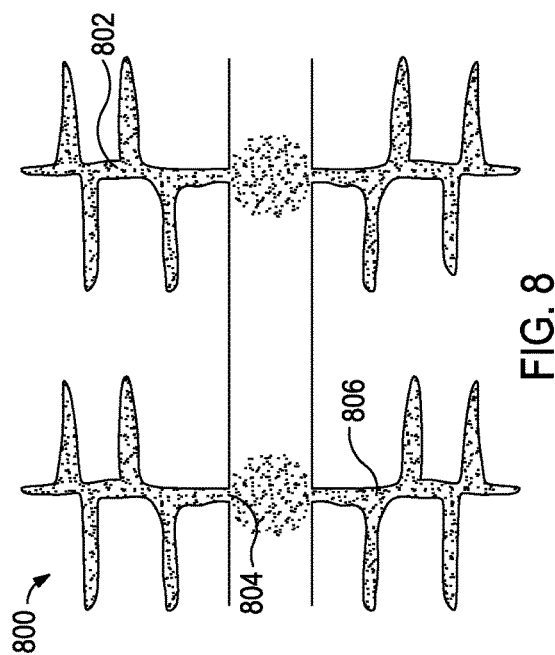
FIG. 8

MULTI-ORIENTED HYDRAULIC FRACTURING MODELS AND METHODS

BACKGROUND

The present application relates to modeling fracturing operations.

Oil and gas wells often produce hydrocarbons from subterranean formations. In some instances, it is desired to add additional fractures to an already-fractured subterranean formation. For example, additional fracturing may be desired for a previously producing well that has been damaged due to factors such as fine migration. Although the existing fracture may still exist, it is no longer effective, or less effective. In such a situation, stress caused by the first fracture continues to exist, but it would not significantly contribute to production. In another example, multiple fractures may be desired to increase reservoir production. This scenario may also be used to improve sweep efficiency for enhanced recovery wells such as water flooding steam injection, etc. In yet another example, additional fractures may be created to inject with drill cuttings.

In some instances, mathematical modeling is used to design the second fractures. However, the conventional mathematical modeling is only based on the elastic characteristics of the formation. Accordingly, conventional methods and models for initiating additional fractures typically induce the additional fractures with near-identical angular orientation to previous fractures. While such methods increase the number of locations for drainage into the wellbore, they may not introduce new directions for hydrocarbons to flow into the wellbore. Conventional methods and models may also not account for, or even more so, utilize, stress alterations around existing fractures when inducing new fractures.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIGS. 7A and 7B illustrate a fractured portion of a formation with a large stimulated reservoir volume (SRV) and low connected SRV (CSRV).

FIG. 8 illustrates a fractured portion of a formation with both a large SRV and CSRV.

DETAILED DESCRIPTION

The present application relates to modeling fracturing operations with a multi-oriented hydraulic fracturing (MOHF) model that incorporates the pseudo-plastic properties of the formation and tiny tectonic motions from fracturing to enhance MOHF operations.

Figure 1:
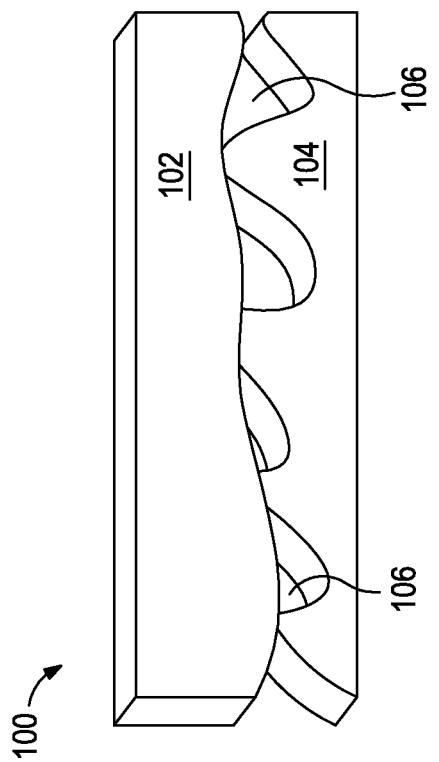
FIG. 1 illustrates two juxtaposing layers in a shallow portion of a subterranean formation.

Generally, in a subterranean formation, the upper portions or layers provide for greater natural conductivity than the lower portions or layers. For example, FIG. 1 illustrates two juxtaposing layers 102,104 in a shallow portion of a subterranean formation 100. The lower layer 104 supports the upper layer 102. Further, the layers 102,104 may slip between each other, which changes the burden on the lower layer 104 for supporting the upper layer 102. Because the illustration is of a shallow portion of the subterranean formation 100, the burden on the lower layer 104 is sufficiently low to allow the small peaks of layer 104 to support this burden. By supporting the burden with the small peaks, permeable zones 106 are maintained between the layers 102,104.

Figure 2:
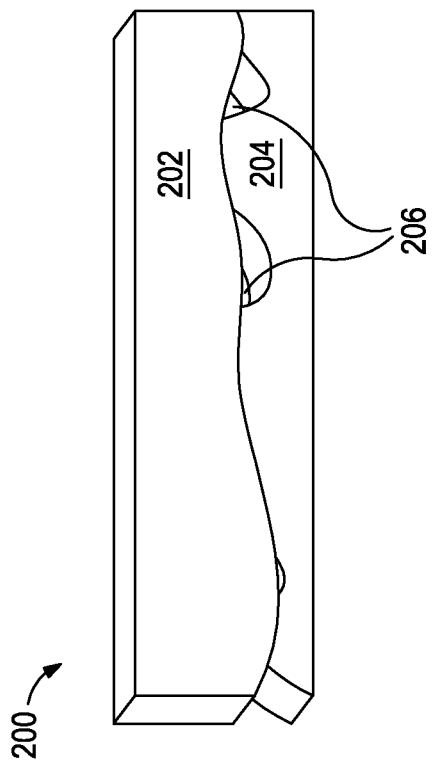
FIG. 2 illustrates two similar juxtaposing layers in a deep portion of a subterranean formation.

By contrast, FIG. 2 illustrates two similar juxtaposing layers 202,204 in a deep portion of a subterranean formation 200. As described above, the upper layer 202 is supported by the lower layer 204, and the layers 202,204 may slip between each other. However, because the illustration is of a deep portion of the subterranean formation 200, the burden on the lower layer 204 is sufficiently high that the rock of the lower layer 204 becomes compacted, harder, and less permeable. In some instances, portions of the lower layer 204 may become implanted into the upper 202. Accordingly, the permeable zones 206 between the layers 202,204 are much smaller as compared to permeable zones 106 illustrated in FIG. 1 in the shallow portion of the subterranean formation 100.

In conventional practice, mathematical models for fracturing typically assumed that when fracturing a subterranean formation, the fracture will follow the known maximum stress direction in a given region of the subterranean formation. However, without being limited by theory, it is believed that even though there is a regional maximum stress direction, the fracture will follow a local maximum stress direction when fracturing a subterranean formation. The MOHF models of the present disclosure calculate the local maximum stress direction when modeling different fracturing scenarios to determine preferred operational parameters for a fracturing operation.

Figure 3:
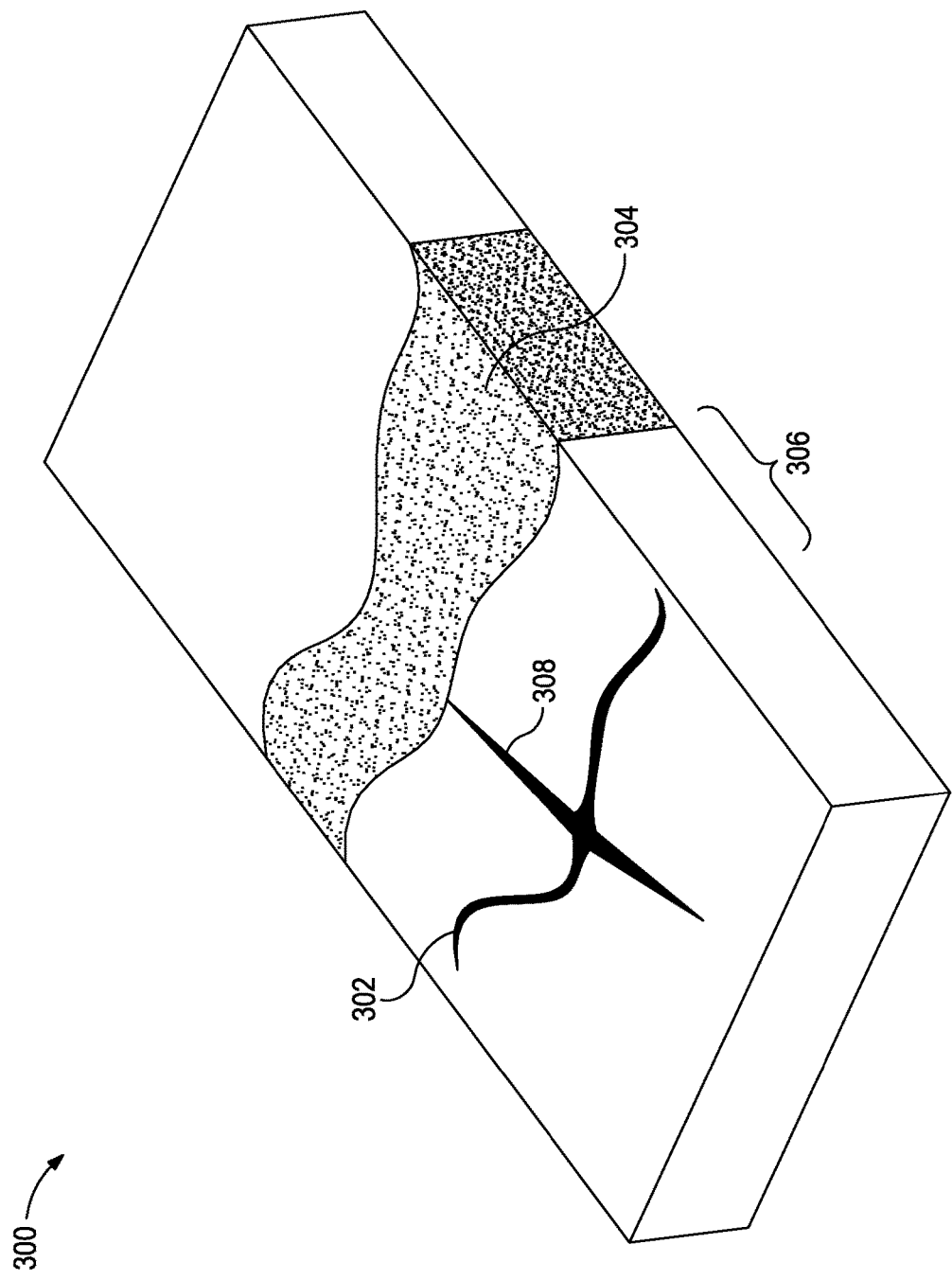
FIG. 3 illustrates a first fracture in a portion of a subterranean formation that is substantially parallel to a permeable zone, and a second fracture that is substantially perpendicular to the permeable zone.

Permeable zones tend to be softer and have minimal stress associated therewith. Accordingly, the fractures created typically form substantially parallel to permeable zone boundaries between or at juxtaposing layers of the formation. Even when the fracturing is designed by placement and direction of wellbore perforations, the fracture will bend and elbow to follow the local maximum stress direction. For example, FIG. 3 illustrates a first fracture 302 in a portion of a subterranean formation 300 that is substantially parallel to a permeable zone 304.

Because the first fracture 302 is parallel to the permeable zone 304, the portion 306 of the subterranean formation 300 therebetween is compressed. Accordingly, the stresses in the portion 306 of the subterranean formation 300 increase. For example, if the first fracture 302 to a width (W) of ½ in and assuming the directly affected distance (D) is 20 ft, then the strain (E) calculated according to Equation 1, would be 0.00104. For a rock having a Young's modulus (E) of 2,500,000 psi, the additional stress (ΔS) to the portion 306 of the subterranean formation 300 caused by the fracture opening, calculated according to Equation 2, is about 2604 psi. Then, assuming the modeled portion of the subterranean formation 300 is about 8,000 ft deep (h), then the stress modifier (δσ), calculated according to Equation 3, is 0.325 psi/ft.

$$\varepsilon = W/2D \qquad \text{Equation 1}$$

$$\Delta S = \varepsilon * E \qquad \text{Equation 2}$$

$$\delta\sigma = \Delta S/dh \qquad \text{Equation 3}$$

Accordingly, if the stress anisotropy contrast of the subterranean formation 300 is less than 0.3 psi/ft, the local fracture direction has been modified drastically, which in this example is about 90°. Therefore, a second fracture 308 in this portion of the subterranean formation 300 would be perpendicular to the first fracture 302 and, as illustrated, extend towards the permeability zone 304. As the distance from the second fracture 308 extends past the affected distance (D), the maximum stresses direction in the formation returns to being substantially parallel to the permeable zone 304. Therefore, the second fracture 308 may bend or elbow as the depth of the second fracture 308 into the subterranean formation 300 increases. However, when fracture propagation occurs via a "jumping mechanism," the fracture widens until the stresses on the tip of the fracture are sufficient that the fracture propagates or jumps about 3 ft to about 10 ft. Then, the widening begins again. The jumping mechanism is common when the rocks undergo brittle failure at the fracture tip.

Assuming the second fracture 308 propagates via the jumping mechanism increases, the stress into the fracture direction (i.e., continuing substantially perpendicular to the first fracture 302 and permeable zone 304) increase, as calculated by Equation 4 assuming a Poisson's ratio (v) of 0.25, by about 0.54 psi/ft for a 3 ft jump to about 0.16 psi/ft for a 10 ft jump. The increased stress continues to direct the second fracture 308 towards the permeable zone 304 even though the second fracture 308 may extend past the affected distance (D).

$$\delta\sigma = \frac{\Delta S * v}{\text{jump distance}} \qquad \text{Equation 4}$$

Fracturing operations that utilize this change in stress anisotropy to create fractures 302,308 in multiple directions or orientations are referred to as MOHF operations.

As described previously, current mathematical models that simulate fracturing assume the formation 300 is elastic. Such an assumption provides for propagation of the second fracture 308 continuing with the added benefits of the jumping mechanism until the system is depressurized or the second fracture 308 intersects another open fracture (natural or man-made). By assuming the formation 300 is elastic, the stress anisotropy will revert back to a situation where the maximum stress direction is substantially parallel to the permeable zone 304.

While formation rocks displace some level of elasticity before the fracture, hydraulic fracturing can semi-permanently change the rocks near the fracture. Therefore, the embodiments described herein model temporary stress changes in the subterranean formation 300 by assuming the subterranean formation 300 has pseudo-plastic properties.

Additionally, large stress changes in a subterranean formation 300 can be attributed to tectonic motions. Typically, these tectonic motions occur on an eon time scale and relate to subsurface movement of a plate or large rock against another layer. These movements are often violent and can result in earthquakes, which changes the anisotropy of the formation 300 drastically. While naturally occurring tectonic motions create large, permanent, regional anisotropy modifications, the embodiments described herein model small tectonic motions that affect very local stresses at the surface of the fractures 302,308 (also referred to herein as fracture faces).

By combining pseudo-plasticity of the subterranean formation 300 and effects of tiny tectonics, the MOHF models described herein calculate short-term stress modifications that may be used for designing MOHF operations with fractures that penetrate further into the surrounding subterranean formation. Further, in some instances, the MOHF models of the present disclosure may incorporate dynamic data about the subterranean formation or components thereof (e.g., how two juxtaposing rocks interact).

The MOHF models described herein assume that the formation layers are substantially horizontal relative to the earth's surface. While vertical layers may be present and can be modelled with additional mathematical manipulations, vertical layers are rarely observed in formations where MOHF operations are preferably performed.

Figure 4:
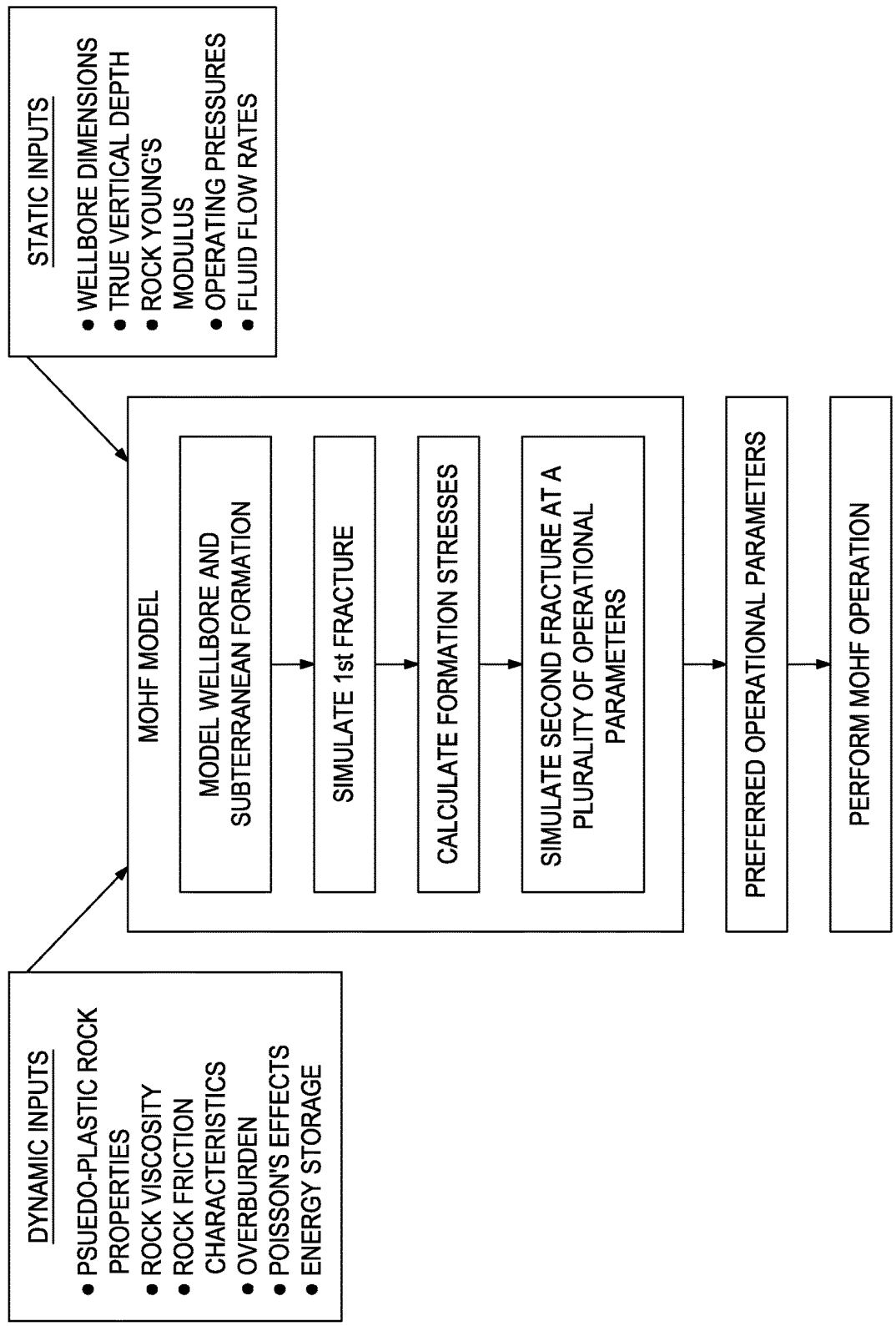
FIG. 4 provides a process flow diagram of a multi-oriented hydraulic fracturing (MOHF) model according to at least some embodiments described herein.

FIG. 4 provides a process flow diagram of an MOHF model according to at least some embodiments described herein. The MOHF model uses static and dynamic inputs. As used herein, "static inputs" refer to properties, parameters, or the like that are based on the native state of the formation, the known wellbore geometry, a recommended fracturing operation, and the like. Exemplary static inputs may include, but are not limited to, wellbore diameter, fracture initiation depth (i.e., depth from the surface in which the fracture will be initiated), Poisson's ratio for the layers in the formation, Young's modulus for the layers in the formation, operating pressures, and the like, and any combination thereof. Generally, static inputs are known or can be obtained from a variety of data repositories. However, in some instances, parameters like flow rate and fluid loss may be considered static inputs because the input flow minus the fluid loss can characterize how fast the fracture opens, which would be considered related to a property of the native state of the formation. Further, the dynamics of the fracture opening, then, relates to the mechanical energy stored by the formation and increases in pore pressures of the formation. These, in turn, contribute to the stress changes caused by the fluid pressure change.

As used herein, "dynamic inputs" refer to properties, parameters, or the like that are based on how layers of the formation interact. In some instances, dynamic inputs may involve translating forces and motion into energy as a function of time where formation layers, cracks, and imperfections may store energy. For example, fluid losses, specifically fluid entrained into the formation matrix, may flow into other areas of the formation and contribute to the stress landscape as well. In some instances, the dynamic effects cease to exist when potential motion of rocks or potential fluid flow through the matrix disappears. Dynamic inputs are uncommon and often unknown. Accordingly, dynamic inputs may be obtained experimentally. For example, "Evaluating Micro-Tectonic Induced Rock Dynamics Requires New Rock Test Equipment" published October 2014 at the ISRM International Symposium 8$^{th}$ Asian Rock Mechanics Symposium describes at least one method and apparatus useful for measuring dynamic inputs.

Figure 5:
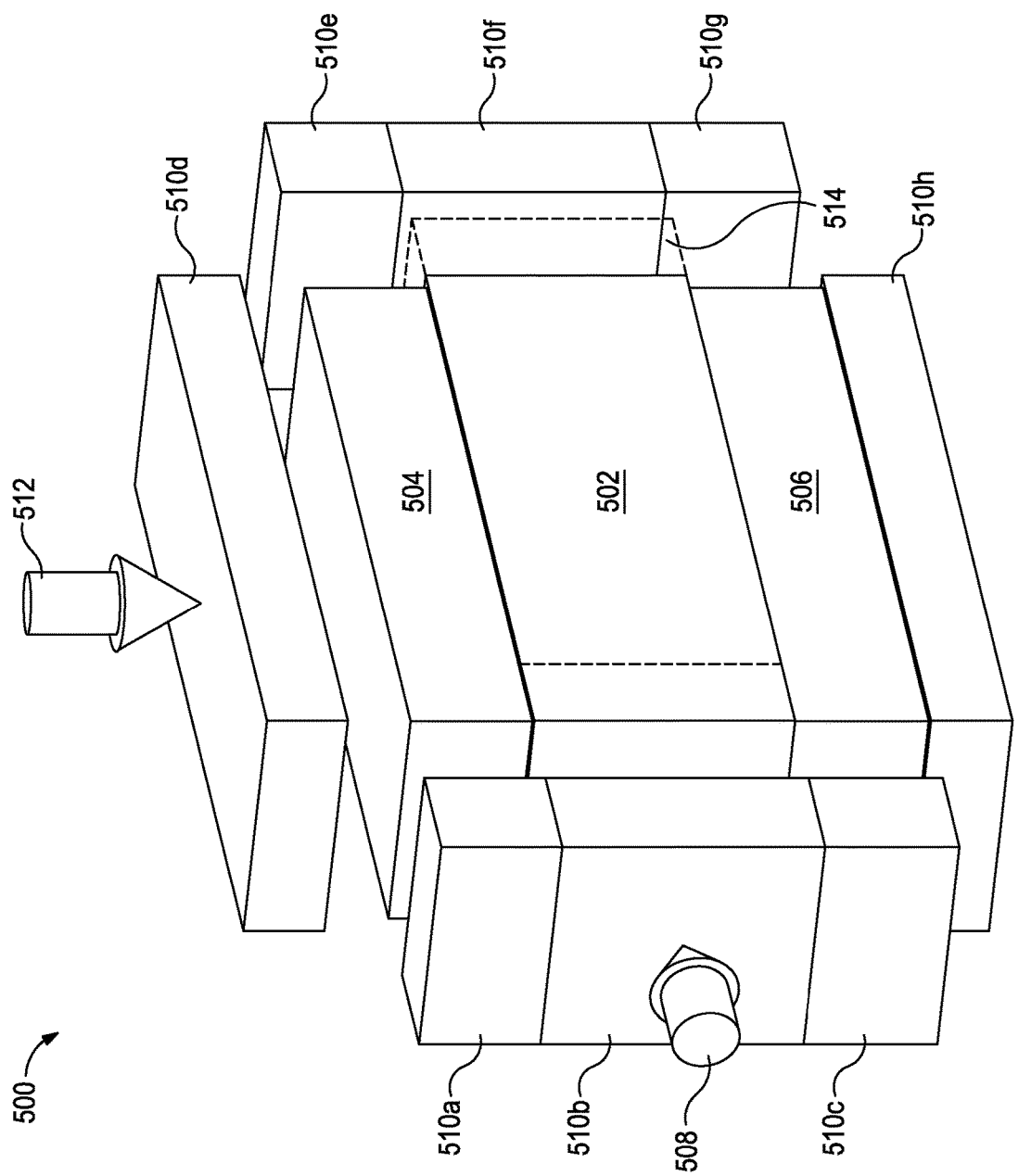
FIG. 5 provides a diagram of a portion of a testing apparatus for measuring or otherwise obtaining dynamic inputs.

FIG. 5 provides a diagram of a portion of a testing apparatus 500 for measuring or otherwise obtaining dynamic inputs. The apparatus 500 may be designed to contain one or more types of rock (illustrated as rocks 502,504,506) and mimic the geological forces and/or conditions (e.g., the presence of pressurized formation fluids like salt water and oil-saturated water) at the fracture initiation depth. A force 508 is applied to one or more of the rocks 502,504,506 using the compression blocks 510a-g (illustrated as a force 508 against rock 502 by compression block 510b and an overburden pressure 512 applied to all rocks 502,504,506 from above by compression block 510d). Various sensors (not illustrated) (e.g., pressure sensors, seismic sensors, and the like) are located around or within the compression blocks 510a-g the rocks 502,504,506 to measure the response of the rocks 502,504,506 to the force 508. In some instances, the sensors may be juxtaposing the rocks 502,504,506 or have material between the sensors and the rocks 502,504,506. For example, the illustrated force 508 causes the middle rock 502 to shift to a second position 514. Sensors associated with or proximal to compression block 510f may be used to measure, for example, a degree of movement of one or more the rocks 502,504,506 where the force 508 is applied (e.g., on a right side of the apparatus 500), a degree of movement of one or more the rocks 502,504,506 at a position opposite where the force 508 is applied (e.g., on a left side of the apparatus 500), a time delay in movement of one or more the rocks 502,504,506 at the position opposite where the force 508 is applied, a degree of movement and/or a time delay of movement of one or more the rocks 502,504,506 normal to where the force is applied (e.g., on a top, bottom, or other sides of the apparatus), a motion at the sensors at the top and sides of one or more the rocks 502,504,506 as a function of time (which may allow for deriving Poisson's ratio, pressure waves, and formation tilt), a temporary increase in overburden stresses, and the like, and any combination thereof.

In some instances, the measurements may be useful in deriving dynamic inputs like the pseudo-plastic properties of the one more of the rocks tested and/or that comprise the subterranean formation of interest. Exemplary dynamic inputs that may be derived include, but are not limited to, pseudo-plastic properties (e.g., viscosity of the one or more rocks 502,504,506 and energy storage in the one or more rocks 502,504,506 as a function of time), time lapse for when to initiate the second fracture, pump speed for the second fracture to achieve maximum extension from the wellbore, a redistribution of Poisson's ration within the one or more rocks 502,504,506, and the like, and any combination thereof.

Regarding rock viscosity, the true viscosity ($\mu$) of rock elements is very high, or in other words, true viscous movements are essentially nil. Rather, the present model relies on the "macro motion" of rocks attributed to sliding of rock layers. In essence, the behavior may best be reflected by the Couette friction flow concept where distinct rock layers are assumed to be fluid layers in the formation structure. Thus, the device in FIG. 5 is used to define or otherwise measure the friction characteristics of the rocks during forced motion (like fracturing). Friction values at various conditions are obtained. These friction values can be reflected as many dynamic inputs: overburden increase, energy storage means, control release mechanisms, and even elastic effects. From these values, the start time for the second fracture can be determined as well as the Poisson's ratio, required fracture pressures, and the like. Most important to the process, though, are the computed stress modification, the "wave-like" behavior of the stresses, which for determining the required second fracture extension velocity, which help maximize the extension of the second fracture.

Figure 6:
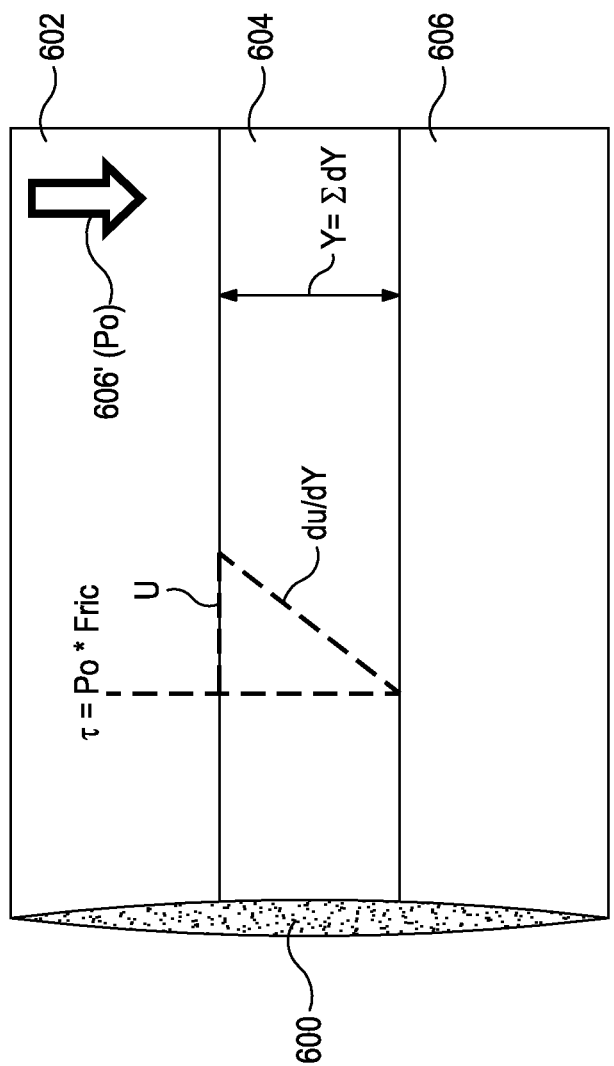
FIG. 6 illustrates Couette flow of a rock.

The Couette flow of the rock is illustrated in FIG. 6. A fracture 600 extends perpendicular to three parallel rocks 602,604,606.

Starting with the overburden pressure 606, it is assumed that the only force is that supporting the weight of the rock above and, therefore, the overburden pressure 606 ($P_0$) is approximately the same as the value of depth true vertical depth (TVD) (i.e., depth from the earth's surface) in feet and represented by Equation 5 (units in brackets).

$$P_0[psi] = TVD[\text{ft}] * 1.0\left[\frac{psi}{\text{ft}}\right] \quad \text{Equation 5}$$

Shear stress $\tau$ is defined by $P_0$*Fric, where Fric is the friction coefficient). Also assume that there are "static" and "dynamic" friction coefficients (or "stuck" and "perturbed") that are different. The friction coefficients depend upon the rocks and may be determined by laboratory testing.

FIG. 6 also illustrates that there is a small relative motion (du) for each infinitesimal height (dY). In a very soft formation, such as the diatomite formations in the western US, the true "fluid" relationships would hold. However, in most commonly found consolidated formations, there will be stronger layer boundaries than others. Therefore, only the $\Sigma dY$ or Y is discussed, as shown in the figure. In this case, U will be the slip rate, linearly changing from 0 to U at a formation layer height of Y. The viscosity of the rock is shear stress over shear rate as shown in Equation 6 (units in brackets).

$$\mu = \frac{Y}{U}*\tau[psi*s] = 68947.7*\frac{Y}{U}*\tau[\text{Poise}] \quad \text{Equation 6}$$

Assuming now that the static friction (i.e., the friction coefficient during the opening of the fracture) is approximately 1.2, with 8,000 ft TVD, 1.0 psi/ft vertical stress gradient, layer height Y=20 ft=240 in, and U=5 in/sec, then the rock viscosity would be 3.18*10$^{10}$ Poise. Such large numbers might not mean too much considering small size rocks. However, for formation sized rocks, the movements become significant. Moreover, if one assumes that the dynamic friction is approximately 0.75 times the static friction values, the friction value become 25% smaller while the actuation forces are also smaller, which means that the closure velocity is almost equal to the opening velocity. The time availability would then be at the same level as the fracturing time.

To reflect a viscoelastic material, U is represented a function of time (t) according to Equation 7.

$$U = \frac{\tau}{d\left(\frac{U}{Y}\right)/dt} = \frac{Y*t}{d(U)/dt} \text{ (for constant } Y\text{)} \qquad \text{Equation 7}$$

Other models may be used where the formations are treated as a plastic entity, or better yet, a fluid entity. Generally, any pseudoplastic models would be acceptable, and would help estimate the necessary responses to perform a proper fracture redirection process. For example, the Maxwell model and the Kelvin-Voigt models may alternatively be used.

Referring again to FIG. 4, after the first fracture is simulated and the formation stresses calculated based on the static and dynamic inputs after fracturing, the second fracture may be simulated under a plurality of operational parameters. Operation parameters that may be varied may include, but are not limited to, time delay between the first and second fractures, pumping speeds for the second fracture, and the like, and any combination thereof.

The MOHF may calculate one or more simulated fracture network characteristics that describe the size, shape, or volume of the simulated fracture network. As used herein, the term "fracture network" refers to the fractures, branches, etc. produced or native in the formation after simulated or real fracturing operations. For example, after the first fracture is formed, the fracture network include the first fracture, any branches therefrom, and any natural fractures intersected by the first fracture. After the second fracture is formed, the fracture network has expanded to the first and second fractures, any branches therefrom, and any natural fractures intersected by the first or second fractures.

When the MOHF simulates the various fracturing steps, the simulated fracture network may be characterized by one or more of: an as-stimulated fracture length, an as-stimulated fracture width, an as-stimulated fracture volume, an as-fractured degree of branching, a connected fracture length, a stimulated reservoir volume (SRV), a connected stimulated fracture width, a connected stimulated fracture volume, a connected stimulated degree of branching, a connected stimulated reservoir volume (CSRV), or a combination thereof. As used herein, "as-simulated" refers to the characteristic when the wellbore pressure is still applied to maintain the fracture network open, which is illustrated and described in more detail in FIGS. 7A and 7B below relative to reservoir volume. As used herein, "connected simulated" refers to the characteristic that is still accessible after the wellbore pressure has been reduced, which is illustrated and described in more detail in FIG. 8 below relative to reservoir volume.

FIGS. 7A and 7B illustrate the formation of a fractured portion of a formation with a large stimulated reservoir volume (SRV) and CSRV. FIG. 7A illustrates the fractured portion of the formation 700 while wellbore pressure is sufficient to keep the fractures 702 open. Because the SRV is based on the stimulation portion of the operation, the SRV is calculated while the wellbore pressure is high. Therefore, FIG. 7A has a high SRV. However, because only a portion of the fractures 702 have proppant 706 therein, once the wellbore pressure decreases, the fractures 702 narrow or even close at the perforations 704, which restricts fluid flow through the narrowed perforations and leads to a low CSRV.

By contrast, FIG. 8 illustrates a fractured portion of a formation 800 with both a large SRV and a large CSRV because the proppant 806 fills the fractures 802 and perforation 804.

The MOHF models described herein may calculate one or more simulated fracture network characteristics for the various conditions and/or parameters modeled where preferred operational parameters are determined based on those that are within the top 20% of the one or more simulated fracture network characteristics calculated (preferably, within the top 5%). For example, an as-simulated fracture length may be calculated by the MOHF for each of a plurality of conditions and/or parameters where the preferred operational parameters correspond to one of the as-simulated fracture lengths that is within the top 20% of the as-simulated fracture lengths calculated by the MOHF. In yet another example, connected simulated fracture length and width may be calculated by the MOHF for each of a plurality of conditions and/or parameters where the preferred operational parameters correspond to one of the connected simulated fracture length and width that is within the top 20% of both the connected simulated fracture lengths and widths calculated by the MOHF. In yet another example, the CSRV may be maximized or otherwise enhanced using the MOHF not only by increasing the length and width of the second fractures, but also the inclusion of tip screen out steps where annulus flow is rapidly reduced and then immediately increased to create a Bernoulli effect that traps more proppant in the fractures as described in U.S. Pat. No. 7,237,612.

In the foregoing disclosure, the MOHF model is predicated on simulating the first fracture based on a designed set of parameters. Alternatively, the MOHF model may also vary operational parameters of the fracturing operation that form the first fractures, for example, fluid flow rate, wellbore pressure, and the like. This may further enhance the fracture network formed with the MOHF operation.

Once the MOHF model has provided preferred operational parameters based on the best or substantially the best simulated fracture network characteristics (e.g., within the top 20% of the simulated fracture network characteristics calculated and, preferably, within the top 5% of the simulated fracture network characteristics), a MOHF operation may be performed using the preferred operational parameters.

Figure 9:
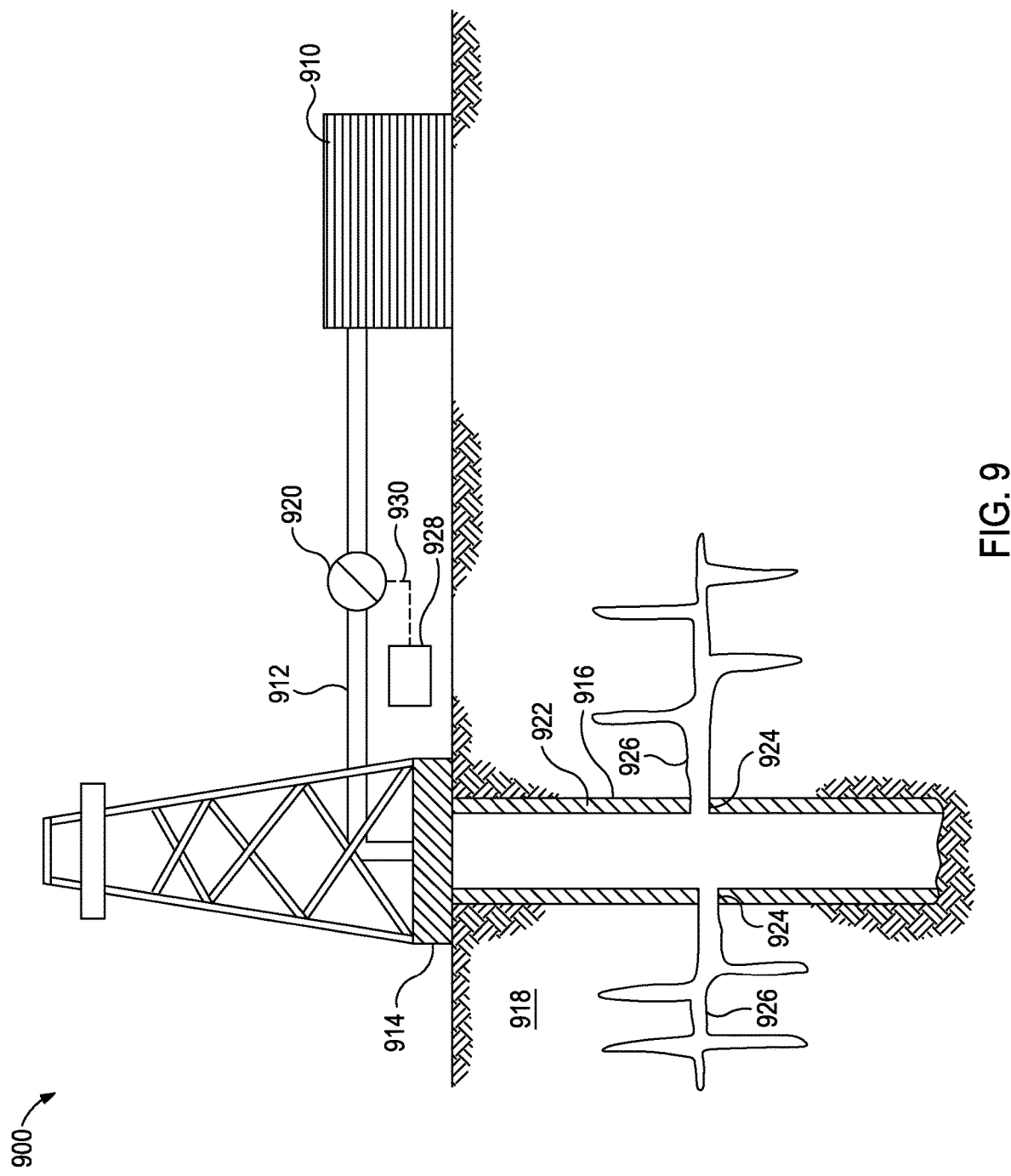
FIG. 9 shows an illustrative schematic of a system suitable for fracturing a subterranean formation.

FIG. 9 shows an illustrative schematic of a system 900 suitable for fracturing a subterranean formation 918 according to one or more embodiments described herein. It should be noted that while FIG. 9 generally depicts a land-based system, it is to be recognized that like systems may be operated in subsea locations as well. As depicted in FIG. 9, system 900 may include mixing tank 910, in which a fracturing fluid and/or proppant slurry may be formulated. The fluid may be conveyed via line 912 to wellhead 914, where the fluid enters wellbore 916 that extends from wellhead 914 into subterranean formation 918. As illustrated, the wellbore is lined with a casing 922. The casing 922 and wellbore 916 have perforations 924 therein that fluidly connect the fractures 926 extending therefrom to the wellbore 916.

In some instances, rather than entering the wellbore 916 direct, the fluid may be conveyed downhole through the wellbore 916 via a tubular with orifices at or near (e.g., within 50 ft) of the perforations 924. Further, to isolate the portion of the wellbore 916 with the perforations 924, zonal isolation tools like packers may be implemented.

In yet another embodiment (not illustrated), the fluid may be conveyed downhole through a tubing having a hydrajetting tool attached thereto at the bottom. The hydrajetting tool may create the perforation and, immediately thereafter, create a large fracture into one planar direction via a HydraJet Fracturing process described in U.S. Pat. No. 5,765,642. Then, optionally, a partial screenout described in U.S. Pat. No. 7,237,612 may be initiated by temporarily dropping the annulus flow, allowing the fracture to fill with proppant or/and diverter material, following the fluid with a much higher rate to open another fracture, repeating the processes as needed, and finally filling the complete fracture or fracture network. Once this process is completed, fluid flow may be temporarily stopped, and the jetting tool is moved up a few feet and turned 90 degrees. Then, after waiting for a prescribed time, the process may be repeated to create new fractures that extend a different direction into the formation.

Pump 920 may be configured to raise and/or decrease the pressure of the fluid to a desired degree before its introduction into wellbore 916. It is to be recognized that system 900 is merely exemplary in nature and various additional components may be present that have not necessarily been depicted in FIG. 9 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 9, the portions of the fluid may, in some embodiments, flow back to wellhead 914 and exit subterranean formation 918. In some embodiments, the fluid that has flowed back to wellhead 914 may subsequently be recovered and recirculated to subterranean formation 918.

The system 900 may also further include a control system(s) 928 (or processor) communicably coupled 930, wired or wirelessly, to various components of the system 900 (e.g., the pump 920) and be capable of executing the mathematical algorithms, methods, and analyses described herein.

The control system(s) 928 and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Exemplary forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, flash EPROM, 3D memory systems, and DNA memory systems. Media may further include data processing systems such as the "Cloud" and similar.

For example, the control system(s) 928 described herein may be configured for receiving static and/or dynamic inputs. The control system(s) 928 may also be configured to perform the MOHF models described herein. Then, the control system(s) 928 may display the preferred operational parameters or execute the preferred operational parameters.

Embodiments described herein include:

Embodiment A: a method comprising: modeling a simulated wellbore penetrating a simulated subterranean formation with a multi-oriented hydraulic fracturing (MOHF) model having (1) static inputs that comprise wellbore properties and subterranean formation properties and (2) dynamic inputs that comprise pseudo-plastic properties of one or more rocks that comprise the subterranean formation; simulating the creation of a first fracture in the simulated subterranean formation with the MOHF model; calculating formation stresses with the MOHF model after the first fracture; simulating the creation of a second fracture in the simulated subterranean formation with a plurality of operational parameters with the MOHF model; calculating a simulated fracture network characteristic for each of the plurality of operational parameters with the MOHF model, thereby producing a plurality of simulated fracture network characteristics; and performing a MOHF operation in a wellbore penetrating a subterranean formation with preferred operational parameters having the simulated fracture network characteristic as calculated with the MOHF model within a top 20% of the plurality of simulated fracture network characteristic;

Embodiment B: a method comprising: modeling a simulated wellbore penetrating a simulated subterranean formation with a multi-oriented hydraulic fracturing (MOHF) model having (1) static inputs that comprise wellbore properties and subterranean formation properties and (2) dynamic inputs that comprise pseudo-plastic properties of one or more rocks that comprise the subterranean formation;

simulating a first fracture in the subterranean formation with a plurality of first fracture operational parameters with the MOHF model; calculating formation stresses with the MOHF model after the first fracture; simulating a second fracture in the subterranean formation with a plurality of second fracture operational parameters with the MOHF model; calculating a simulated fracture network characteristic for each of the plurality of first and second fracture operational parameters with the MOHF model, thereby producing a plurality of simulated fracture network characteristics; and performing a MOHF operation in a wellbore penetrating a subterranean formation with preferred operational parameters having the simulated fracture network characteristic as calculated with the MOHF model within a top 20% of the plurality of simulated fracture network characteristics;

Embodiment C: a system comprising: a wellbore penetrating a subterranean formation; a pump fluidly coupled to the wellbore for conveying fluid into the wellbore and the subterranean formation; a processor communicably coupled to the pump and including a non-transitory, tangible, computer-readable storage medium: containing a program of instructions that cause a computer system running the program of instructions to: receive (1) static inputs that comprise wellbore properties and subterranean formation properties and (2) dynamic inputs that comprise pseudo-plastic properties of one or more rocks that comprise the subterranean formation; model a simulated wellbore penetrating a simulated subterranean formation with a multi-oriented hydraulic fracturing (MOHF) model based on the static and dynamic inputs; simulate a first fracture in the subterranean formation with a plurality of first fracture operational parameters with the MOHF model; calculate formation stresses with the MOHF model after the first fracture; simulate a second fracture in the subterranean formation with a plurality of second fracture operational parameters with the MOHF model; calculate a simulated fracture network characteristic for each of the plurality of first and second fracture operational parameters with the MOHF model, thereby producing a plurality of simulated fracture network characteristics; and output preferred operational parameters having the simulated fracture network characteristic as calculated with the MOHF model within a top 20% of the plurality of simulated fracture network characteristics; and Embodiment D: a processor communicably including a non-transitory, tangible, computer-readable storage medium: containing a program of instructions that cause a computer system running the program of instructions to: receive (1) static inputs that comprise wellbore properties and subterranean formation properties and (2) dynamic inputs that comprise pseudo-plastic properties of one or more rocks that comprise the subterranean formation; model a simulated wellbore penetrating a simulated subterranean formation with a multi-oriented hydraulic fracturing (MOHF) model based on the static and dynamic inputs; simulate a first fracture in the subterranean formation with a plurality of first fracture operational parameters with the MOHF model; calculate formation stresses with the MOHF model after the first fracture; simulate a second fracture in the subterranean formation with a plurality of second fracture operational parameters with the MOHF model; calculate a simulated fracture network characteristic for each of the plurality of first and second fracture operational parameters with the MOHF model, thereby producing a plurality of simulated fracture network characteristics; and output preferred operational parameters having the simulated fracture network characteristic as calculated with the MOHF model within a top 20% of the plurality of simulated fracture network characteristics.

Embodiment A may further include at least one of the following elements: Element 1: wherein the simulated fracture network characteristic is at least one of: an as-stimulated fracture length, an as-stimulated fracture width, an as-stimulated fracture volume, an as-fractured degree of branching, a connected fracture length, a stimulated reservoir volume (SRV), a connected stimulated fracture width, a connected stimulated fracture volume, a connected stimulated degree of branching, a connected stimulated reservoir volume (CSRV), or a combination thereof; Element 2: wherein the preferred operational parameters have the simulated fracture network characteristic as calculated with the MOHF model within a top 10% of the plurality of simulated fracture network characteristics; Element 3: wherein the preferred operational parameters have the simulated fracture network characteristic as calculated with the MOHF model within a top 5% of the plurality of simulated fracture network characteristics; Element 4: wherein the pseudo-plastic properties of the one or more rocks that comprise the subterranean formation comprises a viscosity of the one or more rocks that comprise the subterranean formation; Element 5: wherein the pseudo-plastic properties of the one or more rocks that comprise the subterranean formation comprises an energy storage of the one or more rocks that comprise the subterranean formation; Element 6: wherein the plurality of operational parameters comprise a flow rate of a fluid causing the second fracture; Element 7: wherein the plurality of operational parameters comprise a time delay between the first fracture and the second fracture; and Element 8: wherein the plurality of operational parameters comprise a screen out procedure for propping the first and second fractures. Exemplary combinations include: Element 1 in combination with Element 2 or Element 3 and optionally further in combination with one or more of Elements 4-8; Element 2 or Element 3 in combination with one or more of Elements 4-8; Element 1 in combination with one or more of Elements 4-8; and two or more of Elements 4-8 in combination.

Embodiments B, C, and D may further include at least one of the following elements: Element 9: wherein the simulated fracture network characteristic is at least one of: an as-stimulated fracture length, an as-stimulated fracture width, an as-stimulated fracture volume, an as-fractured degree of branching, a connected fracture length, a stimulated reservoir volume (SRV), a connected stimulated fracture width, a connected stimulated fracture volume, a connected stimulated degree of branching, a connected stimulated reservoir volume (CSRV), or a combination thereof; Element 10: wherein the preferred operational parameters have the simulated fracture network characteristic as calculated with the MOHF model within a top 10% of the plurality of simulated fracture network characteristics; Element 11: wherein the preferred operational parameters have the simulated fracture network characteristic as calculated with the MOHF model within a top 5% of the plurality of simulated fracture network characteristics; Element 12: wherein the pseudo-plastic properties of the one or more rocks that comprise the subterranean formation comprises a viscosity of the one or more rocks that comprise the subterranean formation; Element 13: wherein the pseudo-plastic properties of the one or more rocks that comprise the subterranean formation comprises an energy storage of the one or more rocks that comprise the subterranean formation; Element 14: wherein the plurality of first fracture operational parameters comprise a flow rate of a fluid causing the first fracture; Element 15: wherein the plurality of second fracture operational parameters comprise a flow rate of a fluid causing the second fracture; Element 16: wherein the plurality of second fracture operational parameters comprise a time delay between the first fracture and the second fracture; and Element 17: wherein the plurality of first and/or second operational parameters comprise a screen out procedure for propping the first and second fractures. Exemplary combinations include: Element 9 in combination with Element 10 or Element 11 and optionally further in combination with one or more of Elements 12-17; Element 10 or Element 11 in combination with one or more of Elements 12-17; Element 9 in combination with one or more of Elements 12-17; and two or more of Elements 12-17 in combination. Further, Embodiment C may further include (optionally with one or more of the foregoing elements) wherein the program of instructions that cause the computer system running the program of instructions to: change a pump operational parameter to achieve the preferred operational parameters.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Figure 10:
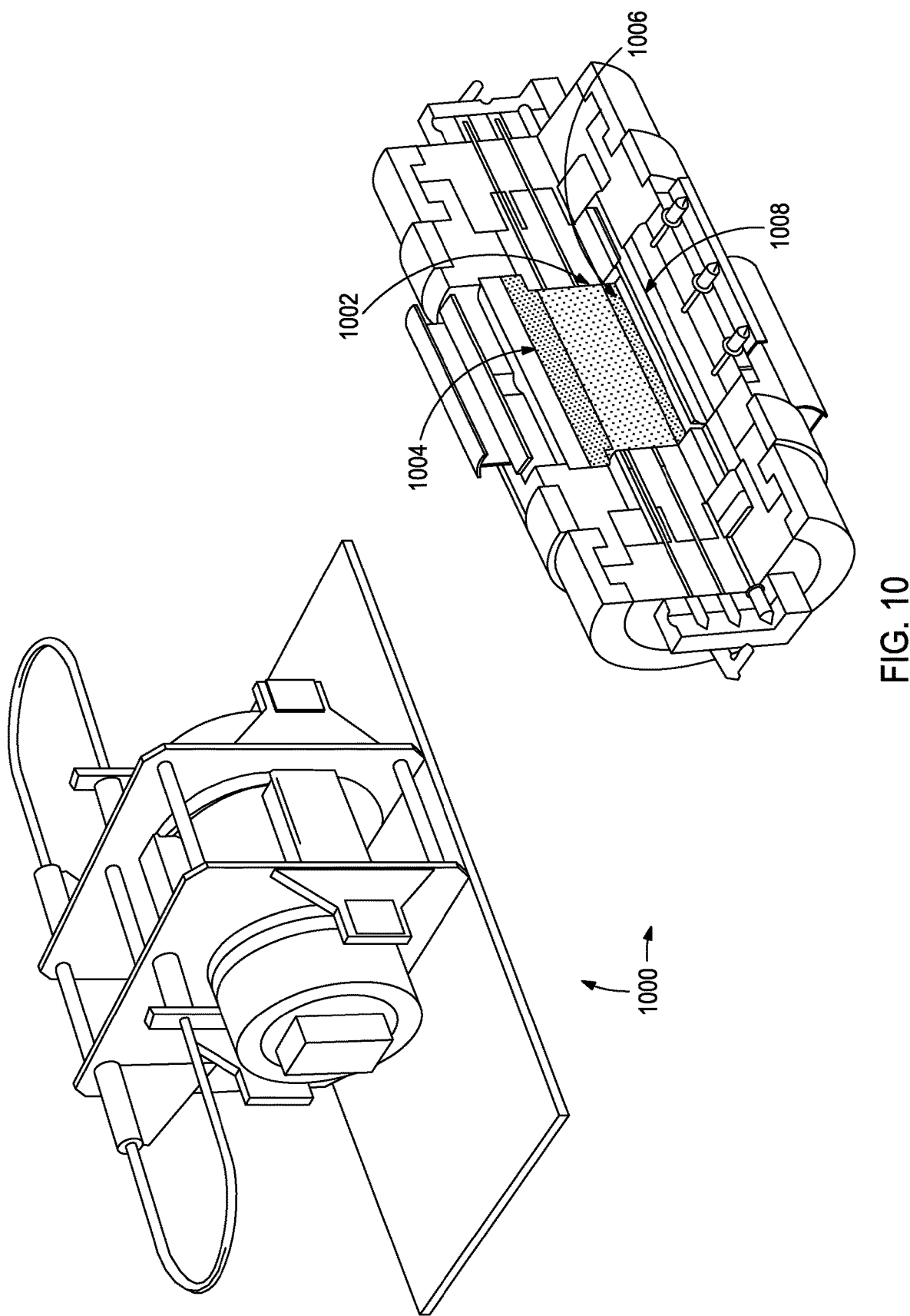
FIG. 10 illustrates a dynamic rock property test device.

Several rocks were tested using a dynamic rock property test device that is functionally similar to the one described in FIG. 5, described in detail in "Evaluating Micro-Tectonic Induced Rock Dynamics Requires New Rock Test Equipment," and illustrated in FIG. 10. A large center rock 1002 cut precisely to 5×5×17.5 in (Rock 2) was placed in this device 1000. This rock 1002 was then placed between rock 1004 and rock 1006, as shown. Rocks 1004,1006 were cut precisely to 1.25×5×17.5 in. Note that the chamber has seven pairs (14 each) of high-pressure actuators. All seven pairs were initially pressure balanced to simulate the static forces caused by the formation. During the initiation of the test, the rocks 1002,1004,1006 were gradually pressurized. Any quick change can cause the rocks to break. After all forces and pressures were stabilized at the intended levels, they were maintained at that level for a few days, thus allowing the rock surfaces to stick to each other as a result of static friction, surface asperities implantations, and diagenesis.

There are 30 probes 1008 (only one called out in the figure) in the device 1000 (only a few are illustrated). Each probe 1008 can be instrumented with either or both position sensing and microseismic sensing. Potentially, 60 data sources could be recorded for an accurate portrayal of pseudo-plastic behavior. It is thought, however, that approximately half will provide sufficient data for the task, even though one type of sensor will quantify or qualify the accuracy of the other. For example, there are three position sensors on top. These sensors will provide "coarse" tiltmeter data, sensing the portion of the rock interface. In preliminary test, however, many of the sensors were non-functional, but the data was sufficient for obtaining the required results.

The actual test was performed by pressurizing one side of the center rock 1002. That side was assumed to be a rock piece inside the formation that was exposed to the fracture (i.e., part of the fracture face) or away from the fracture, or was parallel to it. If this face, but not anywhere else, is pushed, then the rock will try to break off from its containment. Considering the overburden compression pressure (in psi) is approximately equal to depth (in feet), it would probably require significant additional pressure to break the rock away from its containment because the rock area is only 5×5 in, approximately 3.5 times the rock length is 17.5 in. For now, this length was selected so that tiltmeter data could be measured accurately. Note also that to "actual size" a test, every dimension must be actual sized as well, but in this case, some miniaturization was still used. Simple scaling was used to reflect an actual-sized motion or force; for the sake of accuracy of axial motion, the block length divided into the sand grain size must be very small. However, this still resulted in a manageable test fixture.

In one test studied the behavior of the Berea sandstone, at 1,100- to 1,200-ft depths, where the "frac" pressure was gradually increased in 250-psi increments (note that some figures from actual laboratory data might show 500-psi increments, which is the actuator pressure, and because the actuator dimension is one-half the rock phase, the actual stress increment is 50%). One data set collected was from the motion detectors, which showed the compressional effects of the rock at all surfaces. In the first test, only two data sets were kept because the values of all other data were suspect, as the transducers might have malfunctioned. Thus, only the dynamic MOHF characteristics in the axial direction (perpendicular to the fracture face, which is probably the most important data set for the MOHF process) are of interest here.

Figure 11:
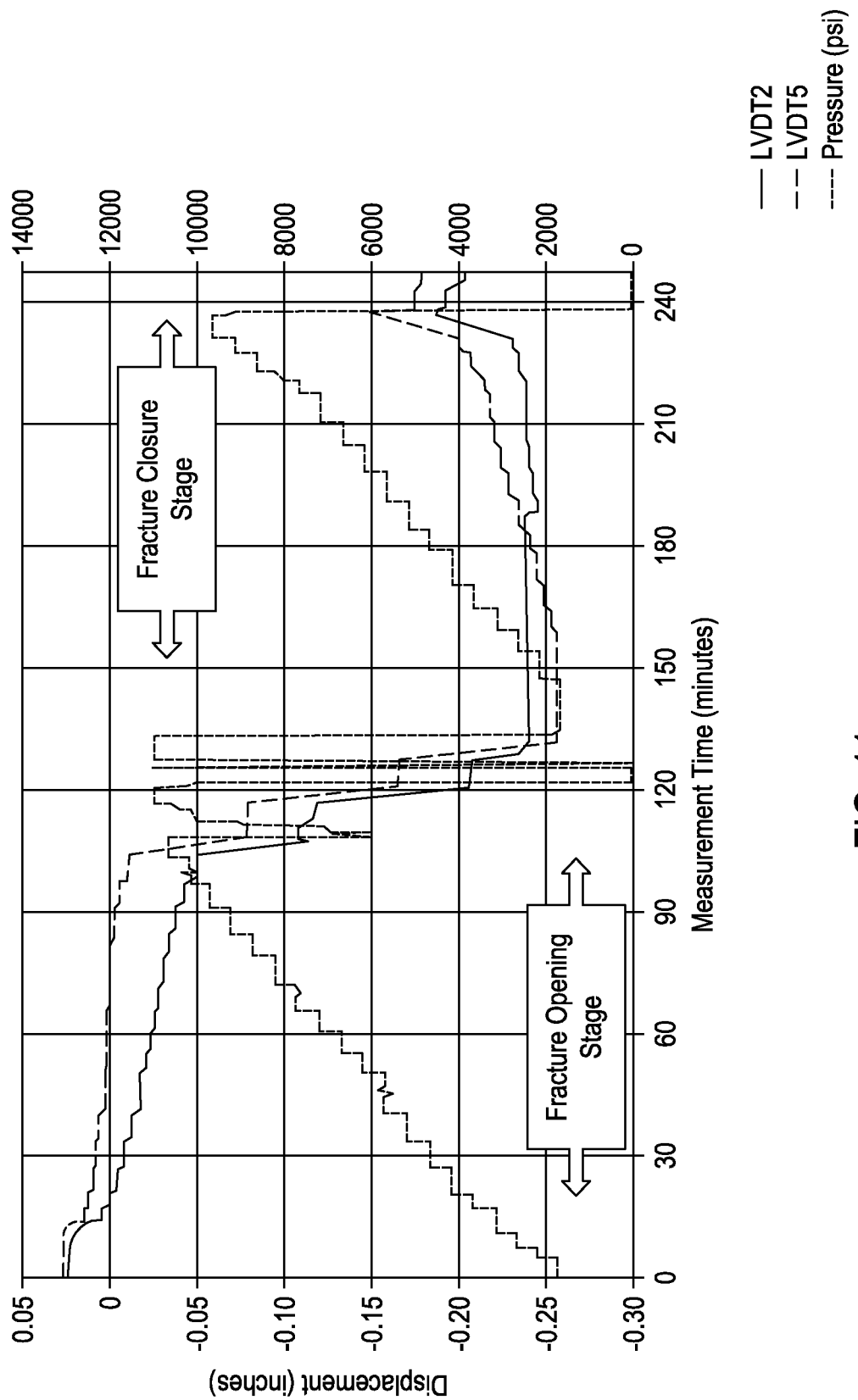
FIG. 11 illustrates a plot of Berea sandstone compressional data as linear variable displacement transducer (LVDT) as a function of time.

FIG. 11 shows the compressional data obtained from the test. The measurement was performed using linear variable displacement transducers (LVDTs) placed at opposite ends of the rock 1002. The left side shows the "fracture opening stage," which is performed after the rock 1002 is compressed for a long period of time at the prescribed depth (in this case, only 1,100 to 1,200 ft, which is the maximum capability of the old equipment). The right side illustrates the "fracture closure stage," which shows fewer compressional effects, as the rock 1002 has "broken loose" (i.e., reflecting the energy storage capability of the MOHF process).

In FIG. 11, it can be observed that the return lag (or fracture closure stage) at similar pressures (the differences between the red and blue lines) averages 15 to 30% less than the lag during the fracture opening stage, which is obviously a predicted outcome, as the interface surfaces were released and insufficient time was given to allow asperity or a diagenesis reconnection of the surfaces. Because the lag value directly relates to the friction or viscosity, this also means a much faster return of the fracture face to the normal prefracture stress anisotropy condition, provided that similar stresses are applied. Fortunately, the stresses during the return or closure stage are much less than the opening stage, even then, they also continuously drop, meaning that the return of the stresses to the prefracturing condition will require a long period of time, allowing more time for the MOHF process to succeed.

Figure 12:
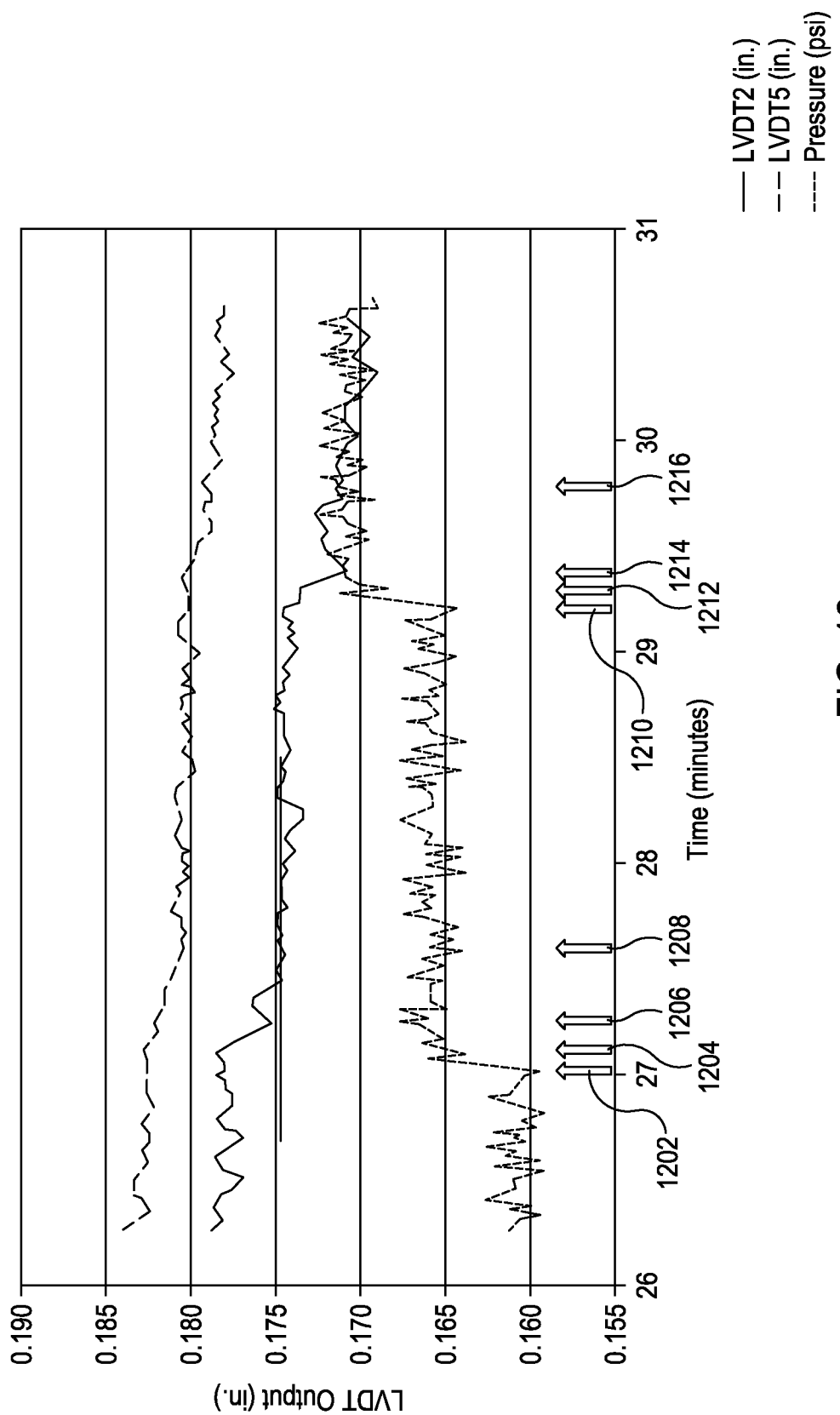
FIG. 12 illustrates a plot of LVDT as a function of time.

FIG. 12 illustrates a plot of LVDT as a function of time, which represents lag and lag rate between rock faces. As the fracture pressure increased illustrated at arrows 1202 and 1210, the fracture face moved by 0.005 in. This motion began late (approximately 5 sec illustrated at arrows 1204 and 1212) and then lagged further by approximately 9 to 10 sec illustrated at arrows 1206 and 1214 where the slope of the LVDT 2 plot became about zero. The opposing side of the rock 1002 movement began at the same time as the fracture face, but the lag rate was three times slower (approximately 30 sec illustrated at arrows 1208 and 1216 where the slope of the LVDT 5 plot became about zero), and the total lag was only 0.0025 in.

Figure 13:
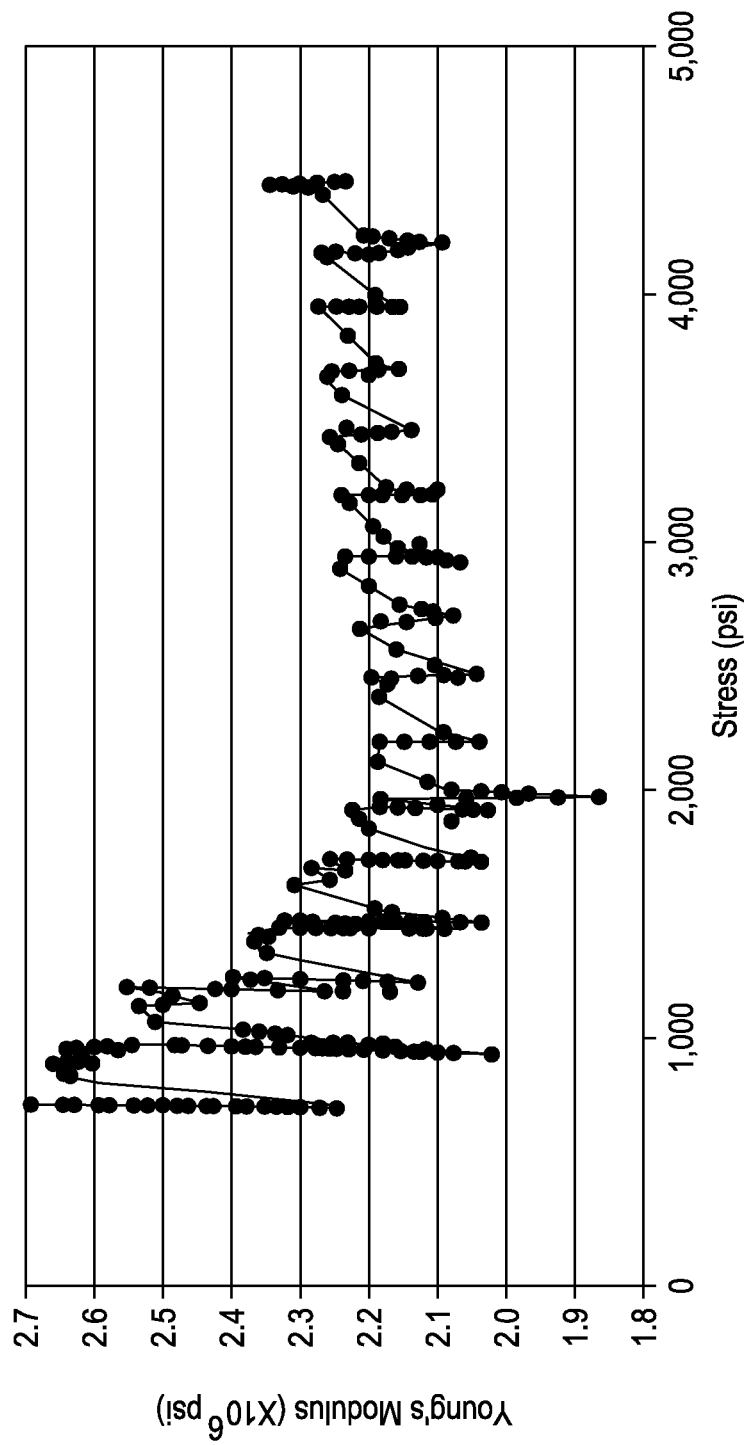
FIG. 13 illustrates a plot of the Young's modulus of Berea sandstone as a function of stress from the MOHF test system.

As discussed previously, many data values can be obtained from the MOHF test equipment, such as Young's modulus, compressive strength, tiltmeter data, and Poisson's ratio. For example, FIG. 13 provides the Young's modulus of Berea sandstone as a function of stress from the MOHF test system. The Young's modulus can be averaged from the data on the right side of the chart of FIG. 13 to be approximately $2.15 \times 10^6$ psi. The left-side values shown in FIG. 13 are invalid, as the data were unstable at that time.

Figure 14:
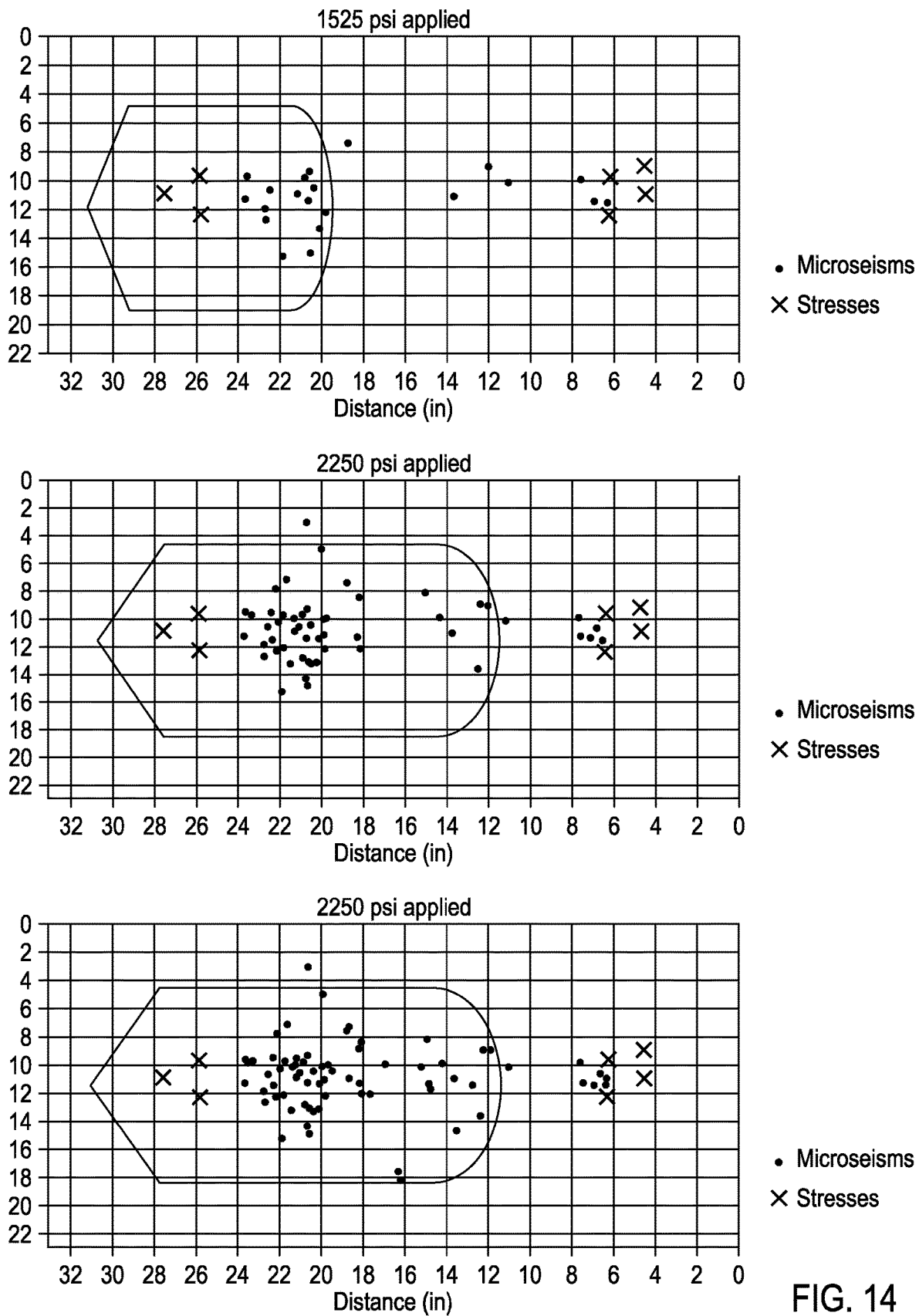
FIG. 14 shows an example output of a dynamic rock testing system portraying the locations of each valid microseism from the top side of the test rock.

The microseismic capability of the test fixture is an important part of the MOHF test apparatus. Using this technology, the release of a surface-to-surface connection can be monitored and triangulated to exactly locate the separation of the surfaces. By doing this, the mechanisms that define the process can be well understood, and better computations can be made to create a good approach for performing a MOHF treatment. FIG. 14 shows an example output of the system, portraying the locations of each valid microseism from the top side of the test box. As can be observed, hundreds of "pings" are captured and reported by the system. In reality, 7.7 million pings were recorded by the system during this test, most of which were deleted because of size limitations or because they were determined to be "impossible" (i.e., out of the required constraints).

In the top figure of FIG. 14, it can be observed that at a 1,525-psi stress level, the top and bottom of the large rock 1002 show a failure (clustered microseisms) at the 6-in. location from the left stresses. Similarly, at 2,250-psi stress, an extension of 14 in. is apparent; however, if this is compared to the microseisms at the 2,550-psi point, it can be observed that the pings might have started on the right side (i.e., the rock failure started on the other side of the test cell). This means that after the rock 1002 fails at the 8-in. point, the data are no longer valid; hence, rock tests must be ended at this point.

When cross-correlating these findings with the Young's modulus plot, the findings do match; the modulus is only correct when the rock 1002 is not restrained on the sides, which occurs exactly at 2,000 psi.

To observe how an MOHF model works, a simulation using finite element analysis (FEA) was performed. In the theoretical assessment of the MOHF model, the FEA and the Couette flow modelling of the rocks was performed using multilayer formations.

Figure 15:
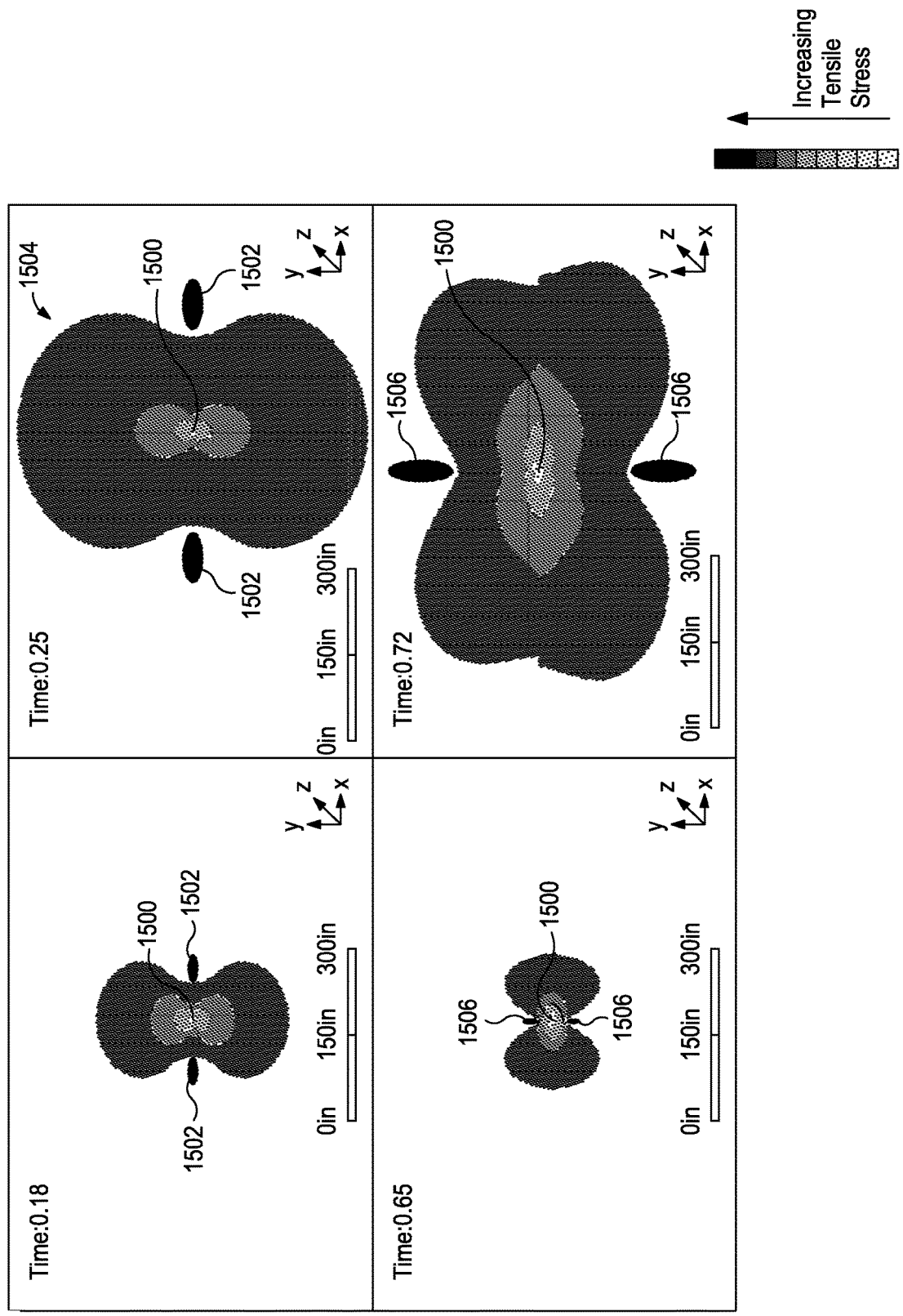
FIG. 15 illustrates a top view of progression of the MOHF fracturing process simulated with the MOHF model.

FIG. 15 shows an example formation cross-section perpendicular to the wellbore 1500 simulated by the MOHF model in a two-dimensional (2D) space. Initially, in the upper left figure, a fracture 1502 is being initiated in the x-direction. The fracture 1502 continues to extend (FIG. 15, top right) while a larger y-direction high-stress field 1504 is realized. If this stress field 1504 could be retained and a restimulation was being performed, then a y-direction fracture 1506 could be realized (as observed in the lower left). The fracture 1506 continues to extend, as observed in the lower right simulation output.

Using a layered formation—in this case, a three-layered rock—the ability to retain "latent" stresses was demonstrated. It can be observed that after the fracture pressure was removed in the simulations, the residual friction stress between the rock layers prevented the center rock 1002 layer from returning to its original shape.

Figure 16:
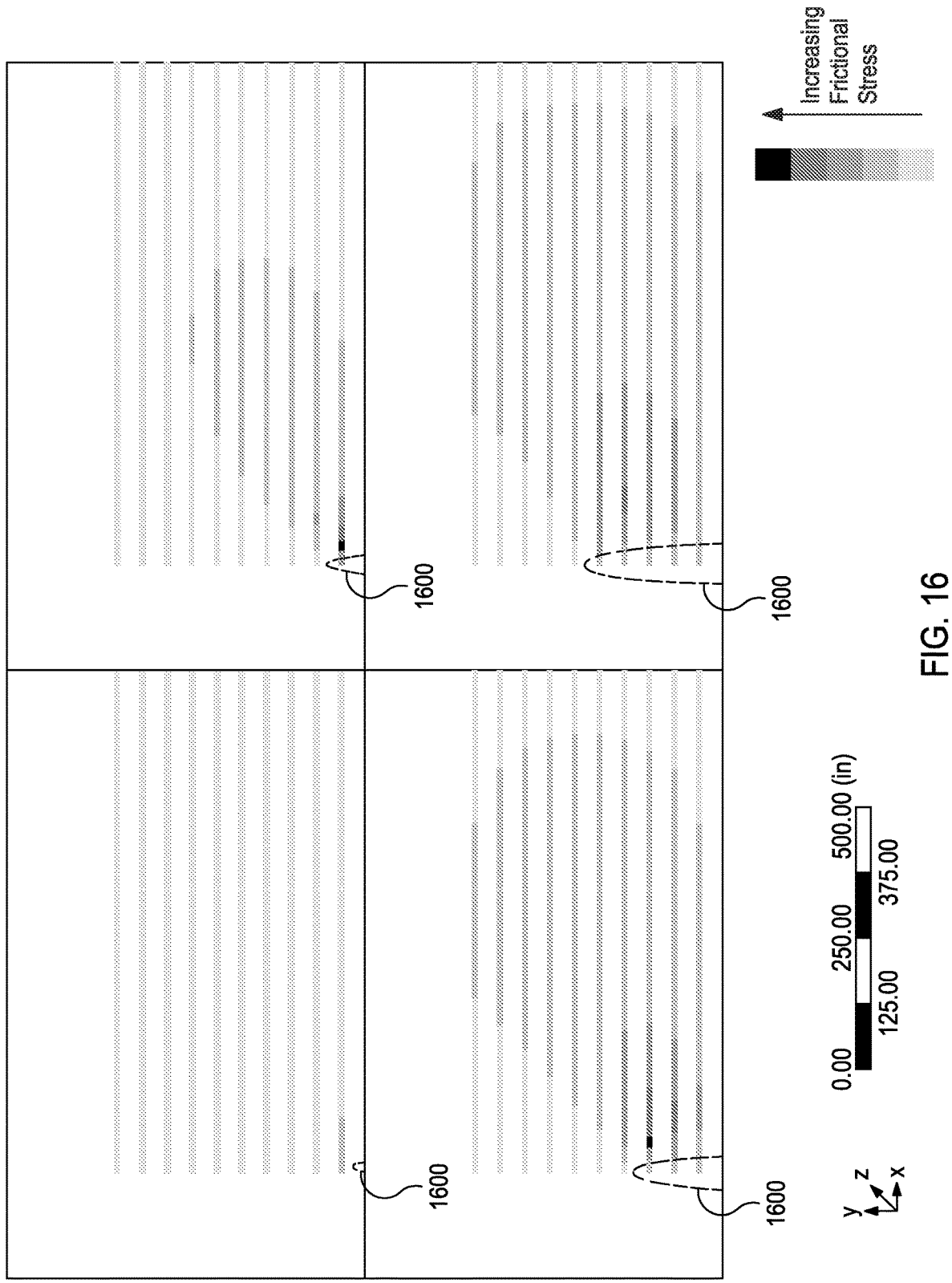
FIG. 16 illustrates the stress creation during fracturing in a 10-layer, layered formation simulated with the MOHF model.

Extending this MOHF model to a multilayered model, FIG. 16 demonstrates the effects of creating a fracture in a multilayered formation. The fracture 1600 initiates (upper left image) and stresses begin to be created (indicated by darker shades). In the next figure (upper right), the fracture extends and the stress shadow extends considerably, even to the upper layers, as shown. The stress shadow continues to enlarge and strengthen as the fracture extends. In the FEA implemented, negative stresses are compressional stresses.

Figure 17:
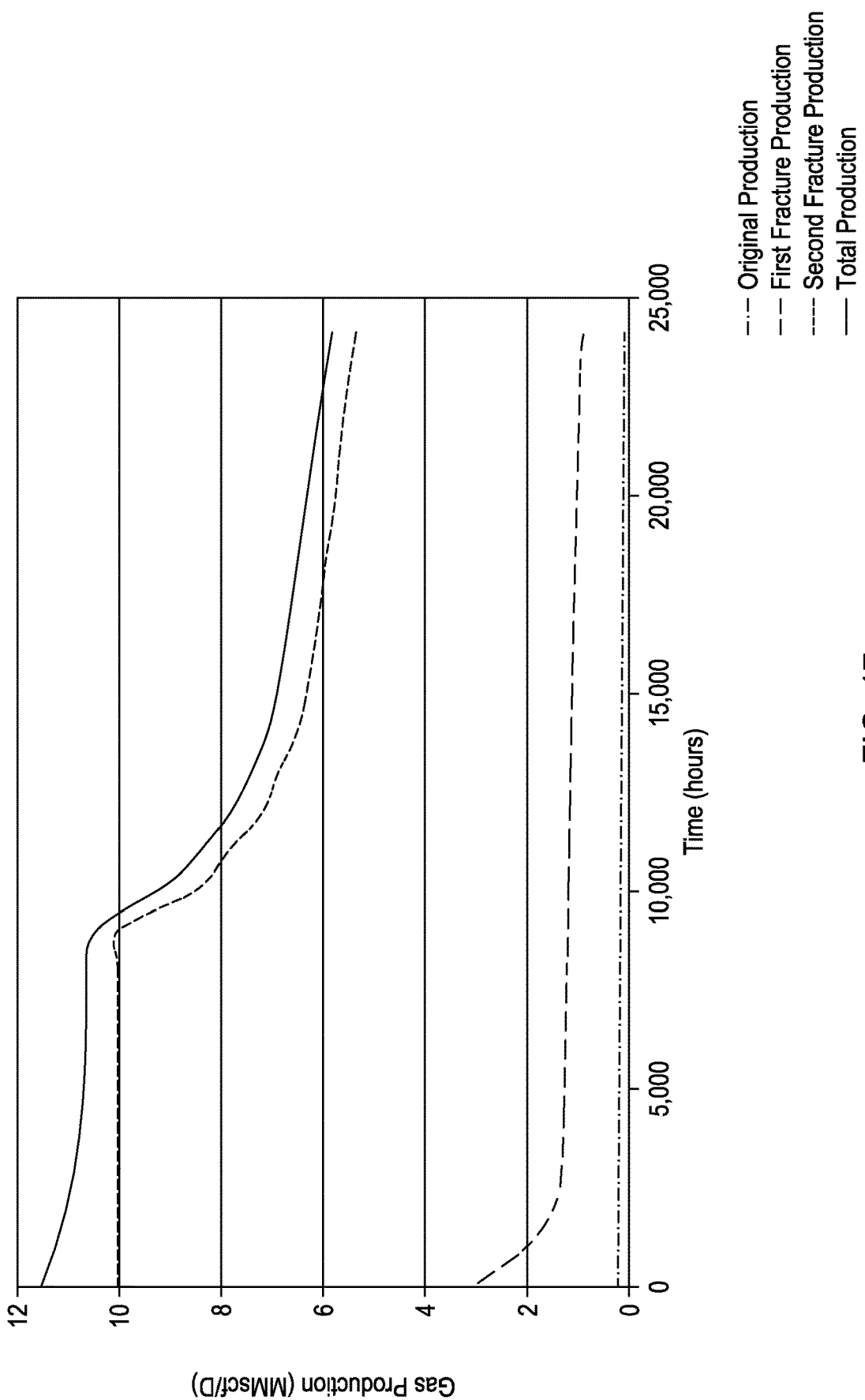
FIG. 17 illustrates the simulated production for the MOHF operation simulated by the MOHF model.

A numerical simulator was used to estimate the possible production improvement when using this process. FIG. 17 illustrates the simulated production, which can be used to compute the return of investment (ROI) for the MOHF operation simulated by the MOHF model. FIG. 17 appears to show an aggressive improvement prediction, but it is logical because MOHF allows entering permeable features not easily achieved by conventional processes. While it does cost more than conventional treatments (up to 50 to 100% more), even a mere 2 times production increase from a single fracture would be sufficient to justify its use.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    modeling a simulated wellbore penetrating a simulated subterranean formation with a multi-oriented hydraulic fracturing (MOHF) model having (1) static inputs that comprise wellbore properties and subterranean formation properties and (2) dynamic inputs that comprise pseudo-plastic properties of one or more rocks that comprise the subterranean formation;
    simulating the creation of a first fracture in the simulated subterranean formation with the MOHF model;
    calculating formation stresses with the MOHF model after the first fracture;
    simulating the creation of a second fracture in the simulated subterranean formation with a plurality of operational parameters with the MOHF model;
    calculating a simulated fracture network characteristic for each of the plurality of operational parameters with the MOHF model, thereby producing a plurality of simulated fracture network characteristics; and
    performing a MOHF operation in a wellbore penetrating a subterranean formation with preferred operational parameters having the simulated fracture network characteristic as calculated with the MOHF model within a top 20% of the plurality of simulated fracture network characteristic.

2. The method of claim 1, wherein the simulated fracture network characteristic is at least one of: an as-stimulated fracture length, an as-stimulated fracture width, an as-stimulated fracture volume, an as-fractured degree of branching, a connected fracture length, a stimulated reservoir volume (SRV), a connected stimulated fracture width, a connected stimulated fracture volume, a connected stimulated degree of branching, a connected stimulated reservoir volume (CSRV), or a combination thereof.

3. The method of claim 1, wherein the preferred operational parameters have the simulated fracture network characteristic as calculated with the MOHF model within a top 10% of the plurality of simulated fracture network characteristics.

4. The method of claim 1, wherein the preferred operational parameters have the simulated fracture network characteristic as calculated with the MOHF model within a top 5% of the plurality of simulated fracture network characteristics.

5. The method of claim 1, wherein the pseudo-plastic properties of the one or more rocks that comprise the subterranean formation comprises a viscosity of the one or more rocks that comprise the subterranean formation.

6. The method of claim 1, wherein the pseudo-plastic properties of the one or more rocks that comprise the subterranean formation comprises an energy storage of the one or more rocks that comprise the subterranean formation.

7. The method of claim 1, wherein the plurality of operational parameters comprise a flow rate of a fluid causing the second fracture.

8. The method of claim 1, wherein the plurality of operational parameters comprise a time delay between the first fracture and the second fracture.

9. The method of claim 1, wherein the plurality of operational parameters comprise a screen out procedure for propping the first and second fractures.

10. A method comprising:
    modeling a simulated wellbore penetrating a simulated subterranean formation with a multi-oriented hydraulic fracturing (MOHF) model having (1) static inputs that comprise wellbore properties and subterranean formation properties and (2) dynamic inputs that comprise pseudo-plastic properties of one or more rocks that comprise the subterranean formation;
    simulating a first fracture in the subterranean formation with a plurality of first fracture operational parameters with the MOHF model;
    calculating formation stresses with the MOHF model after the first fracture;
    simulating a second fracture in the subterranean formation with a plurality of second fracture operational parameters with the MOHF model;
    calculating a simulated fracture network characteristic for each of the plurality of first and second fracture operational parameters with the MOHF model, thereby producing a plurality of simulated fracture network characteristics; and
    performing a MOHF operation in a wellbore penetrating a subterranean formation with preferred operational parameters having the simulated fracture network characteristic as calculated with the MOHF model within a top 20% of the plurality of simulated fracture network characteristics.

11. The method of claim 10, wherein the simulated fracture network characteristic is at least one of: an as-stimulated fracture length, an as-stimulated fracture width, an as-stimulated fracture volume, an as-fractured degree of branching, a connected fracture length, a stimulated reservoir volume (SRV), a connected stimulated fracture width, a connected stimulated fracture volume, a connected stimulated degree of branching, a connected stimulated reservoir volume (CSRV), or a combination thereof.

12. The method of claim 10, wherein the preferred operational parameters have the simulated fracture network characteristic as calculated with the MOHF model within a top 10% of the plurality of simulated fracture network characteristics.

13. The method of claim 10, wherein the preferred operational parameters have the simulated fracture network characteristic as calculated with the MOHF model within a top 5% of the plurality of simulated fracture network characteristics.

14. The method of claim 10, wherein the pseudo-plastic properties of the one or more rocks that comprise the subterranean formation comprises a viscosity of the one or more rocks that comprise the subterranean formation.

15. The method of claim 10, wherein the pseudo-plastic properties of the one or more rocks that comprise the subterranean formation comprises an energy storage of the one or more rocks that comprise the subterranean formation.

16. The method of claim 10, wherein the plurality of second fracture operational parameters comprise a flow rate of a fluid causing the second fracture.

17. The method of claim 10, wherein the plurality of second fracture operational parameters comprise a time delay between the first fracture and the second fracture.

18. The method of claim 10, wherein the plurality of first and second fracture operational parameters comprise a screen out procedure for propping the first and second fractures.

19. A system comprising:
a wellbore penetrating a subterranean formation;
a pump fluidly coupled to the wellbore for conveying fluid into the wellbore and the subterranean formation;
a processor communicably coupled to the pump and including a non-transitory, tangible, computer-readable storage medium: containing a program of instructions that cause a computer system running the program of instructions to:
receive (1) static inputs that comprise wellbore properties and subterranean formation properties and (2) dynamic inputs that comprise pseudo-plastic properties of one or more rocks that comprise the subterranean formation;
model a simulated wellbore penetrating a simulated subterranean formation with a multi-oriented hydraulic fracturing (MOHF) model based on the static and dynamic inputs;
simulate a first fracture in the subterranean formation with a plurality of first fracture operational parameters with the MOHF model;
calculate formation stresses with the MOHF model after the first fracture;
simulate a second fracture in the subterranean formation with a plurality of second fracture operational parameters with the MOHF model;
calculate a simulated fracture network characteristic for each of the plurality of first and second fracture operational parameters with the MOHF model, thereby producing a plurality of simulated fracture network characteristics; and
output preferred operational parameters having the simulated fracture network characteristic as calculated with the MOHF model within a top 20% of the plurality of simulated fracture network characteristics.

20. The system of claim 19, wherein the program of instructions that cause the computer system running the program of instructions to: change a pump operational parameter to achieve the preferred operational parameters.

* * * * *